Patented Sept. 7, 1948

2,449,004

UNITED STATES PATENT OFFICE 2,449,004

PREPARATION OF SUBSTITUTED STYRENES

Charles E. Morrell, Westfield, and Ober C. Slotterbeck, Rahway, N. J., assignors to Standard Oil Development Company, a corporation of Delaware No Drawing. Application December 30, 1944, Serial No. 570,744

12 Claims. (Cl. 260—669)

Our present invention relates to the catalytic dehydrogenation of hydrocarbons, and more particularly it relates to improved methods for the dehydrogenation of mono-olefins and alkylated aromatics.

Our present invention is particularly adapted to the process of dehydrogenating alkylated aromatics containing at least three carbon atoms in side chain including such alkylated aromatics which are further substituted by a second alkyl substituent. For example, a particularly important aspect of our invention involves the catalytic dehydrogenation of isopropyl benzene and homologous isopropylated aromatics to form alpha alkyl styrene compounds such as alpha methyl styrene, o-methyl alpha methyl styrene, etc. It is known in the art that ethyl benzene can be converted to styrene by thermal cracking, preferably in the presence of diluents. It is also known that certain catalysts promote this dehydrogenation reaction, giving higher yields of styrene on the basis of ethyl benzene decomposed. It is also known that isopropyl benzene can be cracked thermally to give reasonably good yields of styrene and alpha methyl styrene, the relative amounts of the latter two depending to a marked degree upon the cracking conditions used. While there has been a limited amount of work done on the use of catalysts possessing dehydrogenation activity as promoting agents for converting isopropyl benzene to these styrenes, to the best of our knowledge no attempt has been made to find a really good catalyst for this reaction.

It is also known (and practiced in the art) to contact ethyl benzene in the presence of steam with a catalyst comprising iron oxide as a chief active ingredient. Various promoting agents, either in combination or singly, are known to have beneficial effects on such iron catalysts. One class of promoting agents includes the compounds of alkali and alkaline earth metals such as sodium, potassium, calcium, barium, etc. Another class of promoting agents are the oxides of such metals as copper, silver, zinc, lead, and chromium. It is preferred to use at least one metal from each one of these classes as promoting agents for the iron catalyst, the preferred one being the combination of potassium and copper (or chromium). Various bases may be employed for such catalysts as carrying agents. Among these are alumina gel, silica gel, kieselguhr, boron oxide and magnesium oxide. The latter is preferred. While iron oxide is the preferred chief active constituent of such a catalyst composition it is also possible to replace it altogether or in part with the oxides of such metals as chromium, molybdenum, tungsten, nickel and cobalt.

It has now been found that the preferred catalyst of the rather wide range given above, namely a catalyst consisting of iron oxide on magnesium oxide promoted by potassium and copper oxides, is a very satisfactory material for dehydrogenating higher homologs of ethyl benzene. First among the latter may be mentioned isopropyl benzene and the isopropylated derivatives of the higher homologs of benzene such as toluene, xylenes, mesitylene, prehnitene, etc. This particular catalyst has the advantage that it minimizes the extent of cracking thereby giving maximum yields of a styrene derivative containing the same number of carbon atoms as the alkylated aromatic charged to the reactor. Furthermore, it has the advantage that carbon which tends to accumulate on such catalytic materials is effectively removed as a result of reaction with the steam employed as diluent.

It is a main object of our invention, therefore, to dehydrogenate catalytically alkylated aromatics containing at least three carbon atoms in an alkyl side chain and to provide a catalyst for the process which will permit dilution of the reactants with large volumes of steam without adversely affecting the said catalyst.

It is a further object of the present invention to provide a process for catalytically dehydrogenating alkylated aromatics containing at least three carbon atoms in the alkyl substituent and to provide catalyst containing an ingredient which will tend to retard the deposition of coke on the catalyst and thus extend the time period during which the catalyst may be employed without requiring regeneration.

Another object of the invention is to provide a process for dehydrogenating an alkylated aromatic containing at least three carbon atoms in a saturated alkyl substituent and suitable catalyst therefor which is adapted to cause dehydrogenation to yield a di-substituted aromatic compound having a mono-olefinic side chain.

A specific object of our invention is to provide an efficient process for converting isopropyl benzene into alpha methyl styrene and a catalyst which is effective for the reaction, is not adversely affected by steam and tends to retard the deposition of coke on the said catalyst by simultaneously promoting the water gas reaction.

Other and further objects of our invention will appear from the following detailed description and claims.

In order to show the utility of our invention we set forth below by way of illustration the operating conditions, the catalyst employed and the yields of the desired product of three runs which we made to test the utility of our invention. In these runs we used a catalyst which was compounded so as to produce a final composition which contained the following composition in parts by weight:

| Component | Parts by Weight |
| --- | --- |
| MgO | 78.5 |
| Fe$_2$O$_3$ | 20 |
| K$_2$O | 5 |
| CuO | 5 |

A mixture of isopropyl benzene and steam was passed over the above catalyst at various temperatures and flow rates with the results given below:

| Run Number | 144/79 | 144/73 | 144/81 |
| --- | --- | --- | --- |
| Temperatures, °F | 1,116 | 1,171 | 1,202 |
| Steam/Isopropyl Benzene ratio | | 5.9/1 (a) | |
| Steam Feed Rate v./v./hr. STP** | 4,250 | 2,680 | 3,970 |
| Isopropyl Feed Rate v./v./hr. STP | 720 | 454 | 673 |
| Isopropyl Benzene Used, mols | | 1.5000 | |
| Mol per cent Isopropyl Benzene Converted | 38 | 43 | 55 |
| Mol per cent Isopropyl Benzene Reacted to give: | | | |
| Benzene-Toluene | 4 | 5 | 8 |
| Styrene (by refractive index) (b) | 1 | 1 | 16 |
| α-Methyl Styrene (by refractive index) (c) | 86 | 81 | 53 |
| Polymer | 7 | 7 | 11 |
| CO+CO$_2$ | 1 | 3 | |

(a) Composition of the isopropyl benzene-steam azeotrope.
(b) As determined on fraction 154–189° F./100 mm.
(c) As determined on fraction 189–212° F./100 mm.
*v./v./hr. = volumes of steam (or isopropyl feed) per volume of catalyst per hour.
**STP = standard conditions of temperature and pressure.

It can be seen from these results that the catalyst described above is capable of converting a typical isopropylated aromatic to the corresponding alpha methyl styrene with only a small amount of demethanation. The conditions employed in the experiments are not necessarily optimum and are not intended to limit the scope of this invention beyond the general range of conditions outlined above.

To show the utility and advantages of our invention we set forth below the results of two runs we made during which we thermally cracked isopropyl benzene. The following table contains the conditions and the results:

| Run Number | 144/75 | 144/83 |
| --- | --- | --- |
| Catalyst | None | None |
| Temperature, °F | 1,310 | 1,468 |
| Steam/Isopropyl Benzene ratio | 5.9/1 (a) | |
| Steam Feed Rate v./v./hr. STP | 3,600 | 3,450 |
| Isopropyl Feed Rate v./v./hr. STP | 625 | 585 |
| Isopropyl Benzene Used, mols | 1.500 | |
| Mol per cent Isopropyl Benzene Converted | 45 | 89 |
| Mol per cent Isopropyl Benzene Reacted to give: | | |
| Benzene-Toluene | 15 | 19 |
| Styrene (by refractive index) (b) | 14 | 29 |
| α-Methyl Styrene (by refractive index) (c) | 67 | 11 |
| Polymer | 4 | 26 |

(a) Composition of the isopropyl benzene-steam azeotrope.
(b) As determined on fraction 154–189° F./100 mm.
(c) As determined on fraction 189–212° F./100 mm.

It can be seen from the data that our improved method employing the foregoing catalyst gives greatly improved results.

As to the composition of the catalyst, we set forth below a range of propositions for the various ingredients of the catalyst as follows:

Table

| Component | Per cent by Weight |
| --- | --- |
| MgO | 50–97 |
| Fe$_2$O$_3$ | 3–50 |
| K$_2$O | 5–15 |
| CuO | 1–15 |

Instead of using K$_2$O we may use other alkali metal and alkaline earth metal oxides such as calcium, sodium, and strontium oxides, but potassium oxide is greatly superior. Instead of using copper oxide which is the stabilizer, we may use the oxide of silver, the non-acidic transition oxides of chromium, manganese, cobalt and nickel and the non-acidic oxides of zirconium, cerium, lead, bismuth, and particularly aluminum and thorium.

In place of using iron oxide, manganese oxide and choromium oxide may be used to give good catalysts.

However, we prefer to use the catalyst having the composition employed in the specific examples set forth above.

In carrying out our process using the catalyst described above, the hydrocarbon diluted with steam is passed over the catalyst at a rate of from 50 to 5000 volumes, preferably between 100 and 1000 volumes (measured at normal temperature and pressure) of hydrocarbons per volume of catalyst per hour. The ratio of steam to hydrocarbon is between 30 to 1 and 1 to 1, but preferably from 4 to 8 volumes of steam per volume of hydrocarbon. The reaction chamber is maintained at a temperature between 1000 and 1600° F., preferably between 1100 and 1300° F. and the total pressure of the gas and vapors in the reaction zone may be atmospheric, sub-atmospheric, or super-atmospheric. We prefer to operate under pressure conditions such that the total pressure in the reaction zone is about atmospheric which means, of course, that the partial pressure of the hydrocarbon is less than atmospheric depending upon the amount of steam diluent used.

The principal function of the steam is to dilute the hydrocarbon and thus reduce the partial pressure thereof in the reaction zone. However, the steam also performs another useful function in that it reacts with the coke which may be deposited on the catalyst during the reaction to form carbon oxides and hydrogen. The elimination of at least a portion of the coke in this manner tends to prolong the time the catalyst can be used before it requires regeneration. Thus the reaction portion of a complete cycle of reaction and regeneration may be as long as fifteen to twenty-five or fifty hours or more. Also, it is usually preferable to run for periods of from one-half to ten hours in the productive phase and then to regenerate the catalyst.

Regeneration of the catalyst may be effected by discontinuing the flow of hydrocarbon and passing steam, air, or a mixture of steam and air through the catalyst mass while it is maintained at a temperature between 1100 and 1300° F. Following substantially complete removal of coke from the catalyst in this manner, the flow of hydrocarbon and steam through the reaction zone may be resumed.

Our present invention may be carried out either in the stationary bed type of operation or a fluid catalyst type of operation. In the former, the catalyst is contained in a case or reactor, and the mixture of steam and hydrocarbon is simply forced through the material, preferably being discharged into the top, forced through the catalyst, and withdrawn from the bottom. The catalyst is preferably in the form of pellets, pills, granules, and the like. In the fluid catalyst type of operation, the catalyst is in the form of a powder having a particle size of from 100 to 400 mesh and is discharged into the reaction zone from a standpipe together with the hydrocarbon to be dehydrogenated, and steam, the catalyst and vapors entering preferably at a point at the bottom of the reactor and passing upwardly through a grid and forming within the reactor a dense phase suspension, that is to say, a suspension of catalyst in the gases of a concentration such that each cubic foot contains from 2 to 35 or more lbs. of catalyst. This dense phase may be formed within the reaction zone above the grid by controlling the linear velocity of gases or vapors by regulating them within the range of say ½ to 8 to 10 ft./sec. Continuity of operation may be thus obtained and the catalyst may be withdrawn through a bottom draw-off pipe, regenerated, if necessary, and returned preferably substantially uncooled through the aforementioned standpipe to the reactor. The precise details, however, of operating the reactor do not form an important aspect of our present invention and any known reactor adapted to provide good contact between the solid and gas may be employed.

To recapitulate, our present invention relates to improvements in dehydrogenation of alkylated aromatics, to the methods of preparing suitable catalysts therefor, and is characterized also in that we employ a magnesium oxide base in addition to oxides of iron, manganese, cobalt or nickel and a small amount of a promoter and/or a stabilizer. An outstanding advantage of our invention is that we may carry out the dehydrogenation of a hydrocarbon in the presence of large quantities of steam without injuring the catalyst and thus we may greatly extend the life of catalysts since the presence of steam tends to retard the deposition of hydrocarbon contaminants upon the catalyst. Also, the presence of steam makes it possible to supply the heat necessary for this highly endothermic reaction by the superheating of the said steam at least in substantial part and also makes it possible, particularly with the stationary bed type of operation, to control the contact time since dilution with steam of the entering reactant makes it possible to vary the reaction time virtually to any desired value regardless of how small that contact time interval may be.

Having described the nature and purpose of our invention in the best manner in which it may be performed, what we claim is:

1. The method of producing an alpha methyl styrene which comprises contacting a mixture of an isopropyl benzene and steam with a dehydrogenation catalyst under dehydrogenating conditions of temperature and pressure the said catalyst consisting essentially of a major portion of magnesium oxide, a minor portion of iron oxide, a minor portion of copper oxide, and a minor portion of potassium oxide.

2. The method of claim 1 in which ortho methyl isopropyl benzene is dehydrogenated to form ortho methyl alpha methyl styrene.

3. The method set forth in claim 1 in which the catalyst employed is compounded so as to give a product having substantially the following composition in parts by weight: MgO, 78.5; $Fe_2O_3$, 20; $K_2O$, 5; CuO, 5.

4. The method set forth in claim 1 in which from 4 to 10 volumes of steam per volume of isopropyl benzene are charged to the reaction zone.

5. The method set forth in claim 1 in which the temperature in the reaction zone is maintained within the limitation of from about 1100 to 1300° F.

6. The method set forth in claim 1 in which the catalyst is in the form of shaped bodies.

7. The method of forming alpha methyl styrene which comprises mixing isopropyl benzene with steam, and contacting the mixture with a catalyst consisting essentially of magnesium oxide, iron oxide, potassium oxide at elevated temperatures, permitting sufficient contact between the mixture and the catalyst to effect the desired conversion and recovering from the process alpha methyl styrene.

8. The method set forth in claim 7 in which 4 to 10 volumes of steam are mixed with the isopropyl benzene.

9. The method set forth in claim 7 in which the temperature during the contact of isopropyl benzene and catalyst is from about 1100 to 1300° F.

10. The method set forth in claim 7 in which the process is operated continuously, the feed rate of the isopropyl benzene to a reaction zone containing the catalyst is from about 100 to 1000 volumes of isopropyl benzene per volume of catalyst per hour.

11. The method set forth in claim 7 in which the catalyst contains about 78.5 parts by weight of MgO, about 20 parts by weight of $Fe_2O_3$, about 5 parts by weight of CuO, and about 5 parts by weight of $K_2O$.

12. The method set forth in claim 7 in which the reaction is carried out under a total gas pressure which is about atmospheric.

CHARLES E. MORRELL.
OBER C. SLOTTERBECK.

REFERENCES CITED

The following references are of record in the file of this patent:

UNITED STATES PATENTS

| Number | Name | Date |
|---|---|---|
| 1,986,241 | Wulff et al. | Jan. 1, 1935 |
| 2,110,829 | Dreisbach | Mar. 8, 1938 |
| 2,122,790 | Tropsch | July 5, 1938 |
| 2,184,235 | Groll et al. | Dec. 19, 1939 |
| 2,342,980 | Stanley et al. | Feb. 29, 1944 |
| 2,376,191 | Roetheli et al. | May 15, 1945 |
| 2,377,083 | Kearby | May 29, 1945 |
| 2,395,875 | Kearby | Mar. 5, 1946 |